(12) United States Patent
Sing et al.

(10) Patent No.: US 8,279,808 B2
(45) Date of Patent: Oct. 2, 2012

(54) NON-CARRIER DEPENDENT FEMTOCELL AND RELATED METHODS

(75) Inventors: YuenWah Sing, Los Altos Hills, CA (US); Daniel M. Borislow, Palm Beach, FL (US); Gregory L. Wood, Signal Mountain, TN (US)

(73) Assignee: YMax Communications Corp., West Palm Beach, FL (US)

( * ) Notice: Subject to any disclaimer, the term of this patent is extended or adjusted under 35 U.S.C. 154(b) by 158 days.

(21) Appl. No.: 12/774,274

(22) Filed: May 5, 2010

(65) Prior Publication Data

US 2011/0274093 A1 Nov. 10, 2011

(51) Int. Cl.
*H04W 4/00* (2009.01)
(52) U.S. Cl. ....................................... 370/328
(58) Field of Classification Search ............... 370/310.2, 370/310, 31, 328, 331, 332, 338, 400
See application file for complete search history.

(56) References Cited

U.S. PATENT DOCUMENTS

| 7,397,424 B2 | 7/2008 | Houri | |
|---|---|---|---|
| 2009/0137249 A1 | 5/2009 | Horn et al. | |
| 2010/0035615 A1* | 2/2010 | Kitazoe et al. | 455/436 |
| 2010/0173630 A1* | 7/2010 | Han et al. | 455/433 |
| 2010/0285812 A1* | 11/2010 | Murakami | 455/452.1 |
| 2010/0329206 A1* | 12/2010 | Thome et al. | 370/331 |

FOREIGN PATENT DOCUMENTS

WO   WO 2009/019319 A2   2/2009

OTHER PUBLICATIONS

"$3^{rd}$ Generation Partnership Project; Technical Specification Group Radio Access Networks; 3G Home NodeB Study Item Technical Report (Release 8)," 3GPP TR 25.820 V8.2.0, pp. 1-39 (2008).
Huawei: "Text Proposal on HNB Auto-configuration of neighboring cells," 3GPP, R4-082339, 1 page (2008).
International Search Report mailed on Aug. 29, 2011, in International Application No. PCT/US2011/034441.

* cited by examiner

*Primary Examiner* — Kwang B Yao
*Assistant Examiner* — Anh Ngoc Nguyen
(74) *Attorney, Agent, or Firm* — Arnold & Porter LLP

(57) ABSTRACT

The methods and devices of the present disclosure may be used to enable non-carrier dependent, Voice over Internet Protocol (VoIP) femtocells for in-service use with one or more mobile handheld devices. The VoIP femtocell generally includes at least one Radio Frequency (RF) transceiver; and program logic that, at least in part, performs a broadcast channel selection protocol and a handheld reselection protocol, so as to enable one or more mobile handheld devices to select the VoIP femtocell for in-service use. In certain embodiments, the broadcast channel selection protocol includes a configuration phase and a broadcast phase.

38 Claims, 6 Drawing Sheets

NON-CARRIER DEPENDENT FEMTOCELL AND RELATED METHODS

FIELD OF THE INVENTION

This invention is applicable at least in the fields of voice and data communications (e.g., those that implement Voice over Internet Protocol (VoIP) communications) and the field of mobile telephony and, more particularly, in the field of devices, systems, processor program products, and methods of facilitating VoIP communication.

BACKGROUND OF THE INVENTION

VoIP is a technology that allows the packet switched systems and transmission channels that connect computer networks to act as an alternative to traditional circuit switched telephone networks, delivering real-time voice to both standard telephones and personal computers (PCs). VoIP allows an individual to utilize a network connection to transmit voice encapsulated data packets over available local communication lines, such as the Internet. This is typically facilitated by the use of an Analog Telephone Adapter (ATA) which emulates some functions of a phone company's central office and connects via a wired interface to a network like the Internet.

Fixed-mobile convergence (FMC) is a service at the intersection of VoIP, mobile/cellular, and broadband Internet technologies, that attempts to bridge cellular/mobile networks with switched/fixed telephone networks. Two primary methods exist for mobile operators to provide a FMC service in a residential environment with existing handsets, where the legacy analog phone line is not required. The first method requires subscribers to obtain a dual-mode handset and access the network through unlicensed mobile access (UMA), traditionally through the 802.11a/b/g/n connection, also known as wireless fidelity (Wi-Fi). A benefit of UMA is that the unlicensed frequencies around 2.4 GHz can be utilized freely by the operators and subscribers within regulatory limits for reasonable transmitted power levels.

An alternative approach for offering FMC is to deploy a "user base station" or femtocell, directly within the subscribers' premises, e.g., home or office. With a femtocell, the handset (mobile device) accesses the femtocell through traditional licensed spectrum, via a radio link that implements traditional mobile network standards. The power levels between the femtocell and the attached mobile device are generally much lower than the power levels between a macrocellular base transceiver station (BTS) and mobile device, because the limited range of the femtocell is intended to cover the subscriber's premises.

There is a need in the art for femtocell devices that can deliver fixed-mobile convergence solutions to facilitate VoIP voice and data transmission.

SUMMARY OF THE INVENTION

The present disclosure relates to telephony services. More particularly, the present disclosure relates to methods and devices that facilitate voice and/or data transmission through a Voice over Internet Protocol (VoIP) network via use of a VoIP enabled, non-carrier dependent femtocell.

The present disclosure is best understood with reference to the claims, the entire specification, and all of the drawings submitted herewith, which describe the devices, systems, processor program products and methods of the present invention in greater detail than this summary, which is merely intended to convey aspects of illustrative embodiments of the present invention.

By way of example, the disclosed devices (e.g., computers and adapters, such as network adapters), systems, processor program products and methods may include a combination of hardware and/or software that allows the user to overcome problems associated with use of VoIP communications networks.

By way of example, the central processing unit(s), processor(s), controller(s) or program logic in the disclosed devices (e.g., the computers and femtocell devices) can include the ability to enable use of mobile handheld devices with VoIP enabled, non-carrier dependent femtocells.

In accordance with an exemplary embodiment of the present disclosure, a femtocell for use with one or more mobile handheld devices and methods for enabling femtocell for use without regard to mobile network carrier are provided. The femtocell generally includes at least one Radio Frequency (RF) transceiver; and program logic that, at least in part, performs a broadcast channel selection protocol and a handheld reselection protocol, so as to enable one or more mobile handheld devices to select the femtocell for in-service use. In certain embodiments, the broadcast channel selection protocol includes a configuration phase and a broadcast phase. In additional embodiments, the femtocell broadcasts as the dominant basestation in a user communication zone and is the primary basestation available for a mobile handheld device for in-service use within the user communication zone without regard to mobile network carrier.

Additional objects, advantages and novel features of this invention will be set forth in part in the description that follows, and in part will become apparent to those skilled in the art upon examination of the following description, or may be learned by practicing the invention.

BRIEF DESCRIPTION OF THE DRAWINGS

In the accompanying drawings that form a part of the specification and are to be read in conjunction therewith, the present invention is illustrated by way of example and not limitation, with like reference numerals referring to like elements. It should be noted that the connections illustrated in all the Figures of the present disclosure are intended to illustrate interactions. The illustrated connections should be regarded as logical connections, and should not be regarded as limited to physical connections.

FIGS. 4 and 4A-4D are flowcharts illustrating exemplary embodiments and protocols enabling aspects of a femtocell of the disclosure.

DETAILED DESCRIPTION OF THE INVENTION

In the following detailed description, numerous specific details are set forth in order to provide a thorough understanding of the invention. In other instances, well known structures, interfaces, and processes have not been shown in detail in order not to unnecessarily obscure the invention. However, it will be apparent to one of ordinary skill in the art that those specific details disclosed herein need not be used to practice the invention and do not represent a limitation on the scope of the invention, except as recited in the claims. It is intended that no part of this specification be construed to effect a disavowal of any part of the full scope of the invention.

The methods and devices of the present disclosure may be used to enable Voice over Internet Protocol (VoIP) enabled, non-carrier dependent femtocells for in-service use with one or more mobile handheld devices. The femtocell generally includes at least one Radio Frequency (RF) transceiver; and program logic that, at least in part, performs a broadcast channel selection protocol and a handheld reselection protocol, so as to enable one or more mobile handheld devices to select the femtocell for in-service use. In certain embodiments, the broadcast channel selection protocol includes a configuration phase and a broadcast phase. In additional embodiments, the femtocell broadcasts as the dominant basestation in a user communication zone and is the primary basestation available for a mobile handheld device for in-service use within the user communication zone without, necessarily, regard to mobile network provider.

As explained in further detail herein, the term radio frequency (RF) transceiver, and/or transceiver, refers to a component including RF and/or cellular transmitter/receiver capabilities which may operate in either half duplex and/or full duplex modes. As used herein, without intending to be limited, such terms include a single component configuration, in which both transmitter and receiver capabilities are integrated within a single component, as well as multiple component configurations, in which transmitter and receiver capabilities are separated into individual components.

Figure 1:
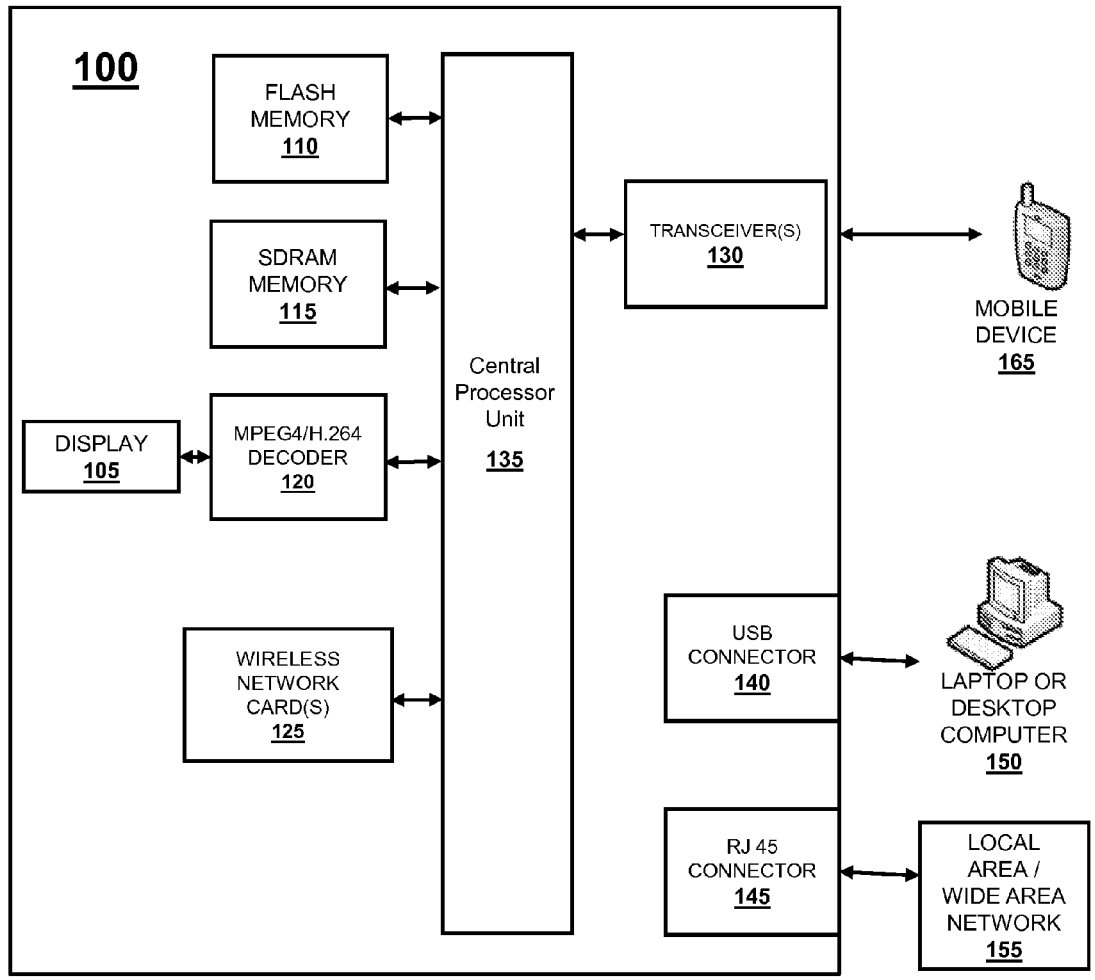
FIG. 1 is a block diagram illustrating a structure of an exemplary femtocell, according to an embodiment of the disclosure.

Any type of mobile handheld device capable of sending and receiving data, including but not limited to voice data (e.g., cellular telephone), via mobile telephony standards known in the art may be used in connection with the present disclosure, and the disclosure is not intended to be limiting in this respect. More particularly, femtocells may be used to interface mobile handheld devices to a VoIP network. In certain aspects, FIG. 1 depicts a block diagram of a structure of an exemplary femtocell 100 according to an embodiment of the disclosure. The description of the femtocell 100 set forth herein and reflected in the figures may be read more broadly and is merely an exemplary embodiment of the present disclosure. By way of example, in some instances, certain components, features, and functions of the femtocell of the invention may be incorporated in a computer or associated software/program logic in communication with the femtocell.

The femtocells described herein may be used with any mobile telephony standards known to those of skill in the art, such as Global System for Mobile Communications (GSM), Code Division Multiple Access (CDMA), Universal Mobile Telecommunications System (UMTS), Long Term Evolution (LTE), Worldwide Interoperability for Microwave Access (WiMAX) or CDMA2000, or any mobile telephone standard that may be developed in the future. In certain embodiments, the femtocell may be optimized or configured to interface with selected or designated mobile telephone standards, e.g. selected based on the desired mobile handheld device(s) to be used in connection with the femtocell. However, the description herein is not so limited. In certain aspects, connectivity to the public switched telephone network (PSTN) may be provided through an Internet connection, and voice data is transmitted through VoIP technologies.

In an embodiment of the present disclosure, with reference to FIG. 1, femtocell 100 may include at least one radio frequency (RF) transceiver 130, and a central processor unit (CPU) 135. Mobile handheld device 165 may connect wirelessly to femtocell 100 via radio transceiver(s) 130. RF transceiver(s) 130 allow the femtocell 100 to both send and receive RF/cellular signals. The RF transceiver(s) 130 may be connected to CPU 135 or it may be integrated with the CPU 135 on a circuit (with or without other components). RF transceiver(s) 130 may send or receive data (e.g., communication data, including voice data, from a handheld mobile device). Femtocell 100 may interface with a computing device, e.g., a laptop or desktop computer 150 via an appropriate interface, e.g., a Universal Serial Bus (USB) connector 140.

As mentioned previously, RF transceiver(s) 130 may be configured as a single component, which both transmits and receives signals in either half duplex or full duplex operation mode. In other embodiments, RF transceiver(s) 130 may be configured with separate transmitter and receiver components, again in either half duplex or full duplex operation mode.

In certain embodiments, CPU 135 may generally control femtocell 100 via appropriate program logic including, but not limited to, baseband processing logic. In certain aspects, CPU 135 may be integrated into a baseband processor unit (not shown), as generally recognized by those of skill in the art. The baseband processor unit and/or CPU 135 may generally include a microprocessor of a kind that is well known to one of ordinary skill in the art. Integrated within a baseband processor unit, or interfaced with CPU 135 is program logic, e.g., baseband processing logic (not shown) which processes data and executes logic in real time.

In certain embodiments, CPU 135 may perform data modulation/demodulation, A/D and D/A conversion if required, and time stamp correlation correction merge as needed to account for interface delay, e.g., delay due to USB 140 or other interface, etc., and to convert user data to the desired data transfer rate. In other embodiments, a computing device, e.g., laptop or desktop computer 150, may perform such functions.

In certain embodiments, CPU 135 may optionally be connected to one or more memory devices such as flash memory 110 and SDRAM 115. The flash memory 110 may be used to store information permanently, such as configuration information and program code, when the femtocell 100 is not powered or is turned off. The SDRAM 115 may be used as a working storage for the CPU 135 during operation.

The display 105, which is an optional feature of femtocell 100, may be used to display information about incoming calls, diagnostics, and/or status information of the femtocell 100. Display 105 may also be used to display video. One of ordinary skill in the art can appreciate that any kind of decoder, such as, for example, an MPEG-4/H.264 decoder, may be used to decode the video output, if any. In certain embodiments, the decoder may be implemented as a dedicated component (e.g., decoder 120), or may be implemented in software running via CPU 135. The display 105 may also be used to display and present advertising, news, information, and/or entertainment to the user. In an alternative embodiment of the invention, the CPU 135 may include circuitry which monitors the signal strength of the wireless network (not shown) employed by femtocell 100, and display 105 may optionally display signal strength information if desired. Signal strength monitoring circuitry is well known to one of ordinary skill in the art.

In one embodiment, a wireless network card 125 may be incorporated into femtocell 100. For example, the wireless network card 125 may be incorporated into femtocell 100 by connecting it via a mini-PCI connector (not shown). Also, the wireless network capability may be built in to femtocell 100 in the form of a semiconductor chip without the use of a separate card, or in any other manner presently known or developed in the future. The wireless network card 125 allows femtocell 100 to access any one or more of available wireless networks. The wireless network card 125 may transmit the information to the network by implementing, for example, a variation of the IEEE 802.11 standard. One of ordinary skill, however, can appreciate that other methods can be employed as well. The wireless network card 125 may be built into femtocell 100 via a replaceable module by a known standard such as PCI, PCMCIA, or USB. By employing a particular wireless card, a user may have access to any number of wireless networks such as Wi-Fi, Wi-Max, EV-DO, HSPDA, or any other wireless network.

In yet another embodiment of the invention, femtocell 100 may be adapted to include multiple wireless network cards. The multiple wireless network cards feature allows the user flexibility to employ different types of wireless network services, such as Wi-Fi and cellular broadband wireless. One of ordinary skill can appreciate that many different services can be employed and the example may be used for illustration and not as a way of limitation. The circuitry may, for example, be adapted to include multiple PCI cards, or other replaceable modules, such as PCMCIA, USB or PCI. The CPU 135 may include program logic which may allow the network interface to adaptively switch between using the wireless network cards to transmit data and allow a user to replace wireless network cards during the operation of femtocell 100. For example, when femtocell 100 is not in range of router 235 (see FIG. 2) via Wi-Fi or other wireless network, femtocell 100 may transmit packetized data from a mobile handheld device via a broadband network such as EV-DO or another applicable broadband network to which a user has a subscription.

Femtocell 100 may also include the capability to be connected to a local area network or wide area network 155. In certain embodiments, femtocell 100 may include one or more physical interfaces, e.g., a RJ-45 interface 145 connection, a Universal Serial Bus (USB) connection 140, etc., in addition to wireless network card(s) 125 to connect to local area network or wide area network 155. Alternatively or additionally, femtocell 100 may be attached directly to a computing device, e.g., laptop or desktop computer 150 via an interface, for example, USB connector 140. Femtocell 100 may connect to the internet via local area network, wide area network, or computing device in a manner known in the art.

In certain embodiments, femtocell 100 may optionally include a subscriber line interface (SLIC) and data access arrangement (DAA) circuit (both not shown) to allow interface to an analog telephone handset (not shown), if desired. The SLIC may generally be responsible for emulating a telephone network central office. It may generate a ring current, detect on-hook and off-hook transition and notify the CPU 135 of any signal transition. The SLIC may also performs A/D conversion on input voice signal and may also perform D/A conversion if required. The DAA may detect a ring current and notify the CPU 135 of the presence of a ring current. The DAA may also create off-hook and on-hook transactions in order to emulate a telephone handset back to the telephone network central office, and may also perform A/D and/or D/A conversion on signals transmitting to and from the equivalent of a telephone network central office (not shown).

One of ordinary skill in the art can appreciate that femtocell 100 requires AC or DC power in order to operate. By way of example and not limitation, the femtocell 100 can be powered from an AC electrical outlet or DC power source, such as the cigarette lighter in an automobile, a DC battery, or the USB port of a computer.

Figure 2:
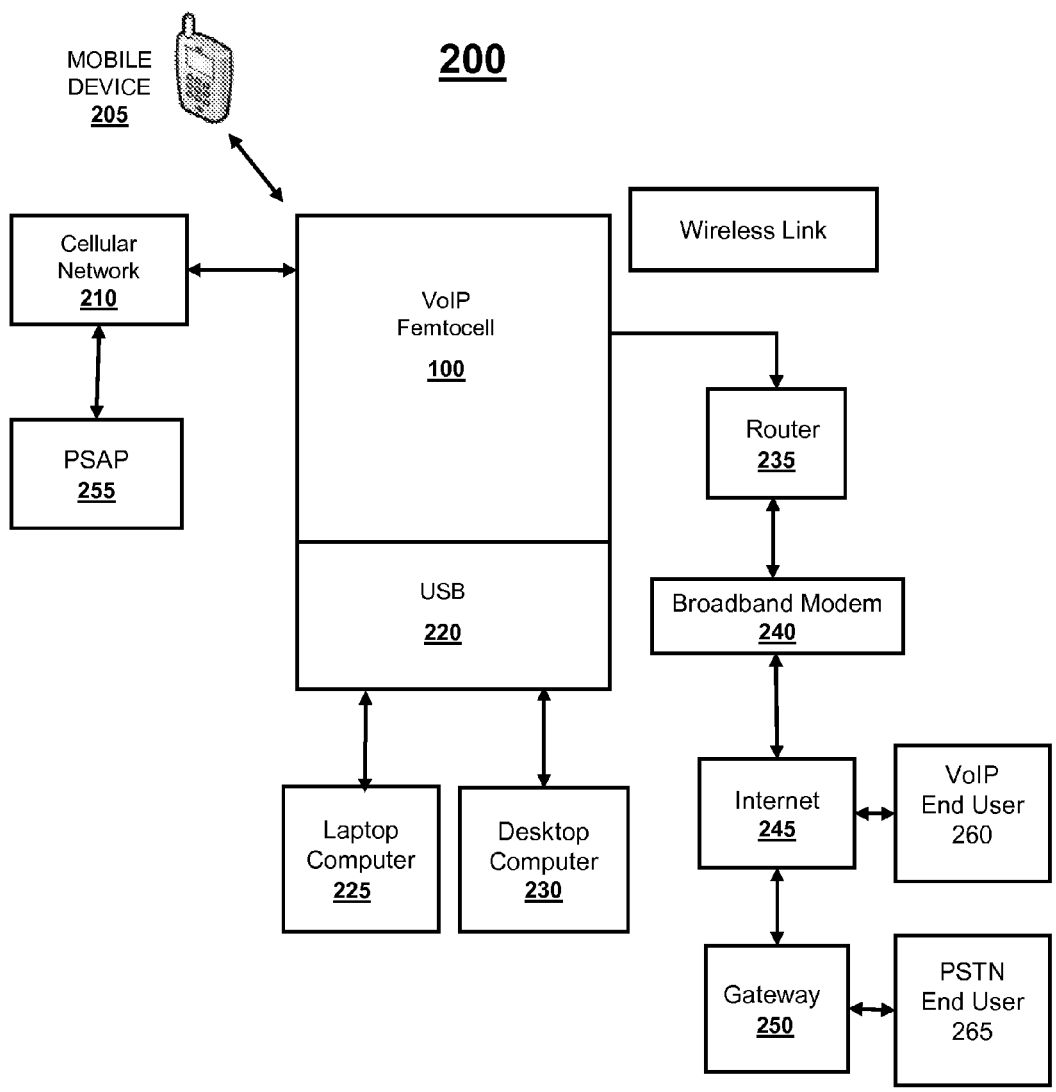
FIG. 2 is a block diagram illustrating a structure of an exemplary communications network, according to an embodiment of the disclosure.

FIG. 2 is a block diagram illustrating a structure of an exemplary communications network 200, according to an embodiment of the invention. The embodiment shown in FIG. 2 is provided for illustration purposes and not by way of limitation. It will be apparent to one of ordinary skill in the art that the elements that make up the communications network can vary and be optimized for different applications. Communications network 200 may, but need not necessarily, include mobile handheld device 205, cellular network 210, femtocell 100, a connector such as a USB connector 220, laptop computer 225, desktop computer 230, router 235, a broadband modem 240, Internet 245, gateway 250, public safety answering point (PSAP) 255, VoIP end-user 260, and PSTN end-user 265.

According to an embodiment of the invention, femtocell 100 may include a wireless network card 125 which allows femtocell 100 to wirelessly connect to a wide area network, such as the Internet 245. As shown in FIG. 2, for example, femtocell 100 may (through a wired or wireless connection) transmit digitized voice data to a router 235, which may then transmit the voice data to the Internet 245 through a broadband modem 240. The router 235 is of a kind well known by those of ordinary skill in the art, such as an 802.11g router. As will be recognized by those of skill in the art, femtocell 100 may be connected to the router 235 through any appropriate standard for wireless communication (e.g., IEEE 802.11) or may have a connector (e.g., a USB or RJ-45 connector) for physically connecting to a router or broadband modem (which may be, for example, a cable, fiber optic or DSL modem). Alternatively, femtocell 100 may include a connector (such as a USB connector 220) for connecting to a laptop computer 225 or desktop computer 230, which is in turn connected (wired or wirelessly) to the internet via a local area network, wide area network, etc. Accordingly, femtocell 100 may use the capabilities and components of a computing device to which it is connected (e.g., a laptop or desktop computer) to communicate over a local area network or wide area network.

In certain embodiments, femtocell 100 can receive digitized voice data from a mobile handheld device 205, or from a laptop computer 225 or desktop computer 230, or any other type of computing or communication device (e.g., via a USB connector 220, wireless network card 125, or other suitable connector).

Figure 3:
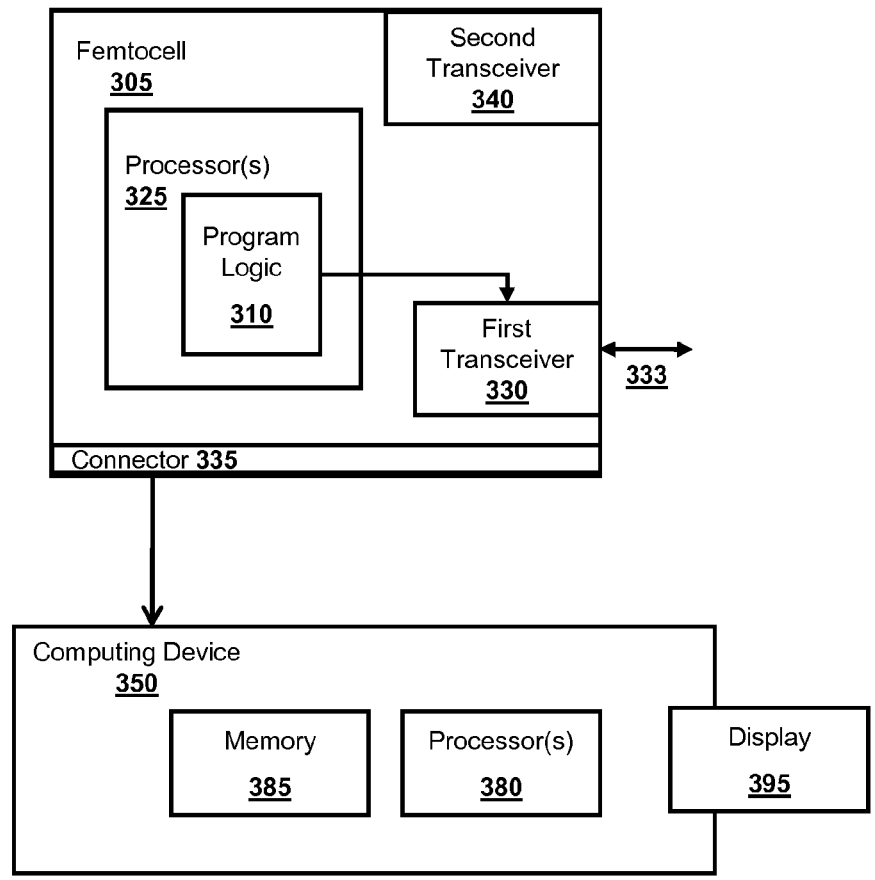
FIG. 3 is a block diagram illustrating a structure of an exemplary computer system, according to an embodiment of the disclosure.

FIG. 3 shows a block diagram illustrating a structure of an exemplary computer system 300 including femtocell 305 for use with a computing device 350. The embodiment shown in FIG. 3 is provided for illustration purposes only, and is not intended to be limiting. Femtocell 305 includes a CPU or other processor 325 running program logic 310, e.g., baseband processing logic. In one embodiment, femtocell 305 further includes a first transceiver 330 (which is capable of transmitting and/or receiving a radio signal 333 to establish a two-way communication channel) and an optional second transceiver 340. Femtocell 305 may include a connector 335 that couples femtocell 305 to the computing device 350. The connector 335 may be a USB connector, a PCI, mini PCI, or other connector. Femtocell 305 may also be wirelessly coupled to a computer via, for example, second transceiver 340.

The computing device 350 includes one or more processors 380 (e.g., CPU), controllers (not shown) and/or program logic (not shown) coupled to memory 385, such as a RAM, a ROM, an SDRAM, an EEPROM, a flash memory, a hard drive, an optical drive and/or a floppy drive. The CPU 325 and program logic 310 of the femtocell 305 may also have memory associated with it to store program logic and/or data used by the program logic to implement the present disclosure.

The computing device 350 may be connected, directly or indirectly, wired or wirelessly, to one or more additional computers or devices (not shown) via one or more data networks (not shown), such as a local area network, wide area network, wireless network, or the Internet. A user may interact with the computing device 350 via input output devices (not shown), such as a keyboard, mouse, trackball, or touch screen. In addition, the computing device 350 may have a display 395, such as a monitor, LCD display, or plasma display, which displays information to the user. The computing device 350 may also be coupled to a printer (not shown) for printing information.

The program logic may be stored in a computer readable medium such as memory. In one embodiment, the computing device 350 may store in a computer readable media, such as the memory 385, at least part of the program logic (and corresponding data) that is used to implement an embodiment of the present invention. Also stored in the memory 385 of the computer 350 may be the data relied upon by the software application code of the present invention. The program logic may also be implemented in hardware via dedicated device incorporating program logic or a controller, for example. The program logic includes software instructions to be executed by the processor 380 or some other processor which is separate from the CPU computing device 350. Alternatively, the program logic may be executed by a processor or a controller on the femtocell 305. In other embodiments, the program logic (and corresponding data) that is used to implement the invention may be stored, at least in part, in memory on the femtocell 305.

Figure 4:
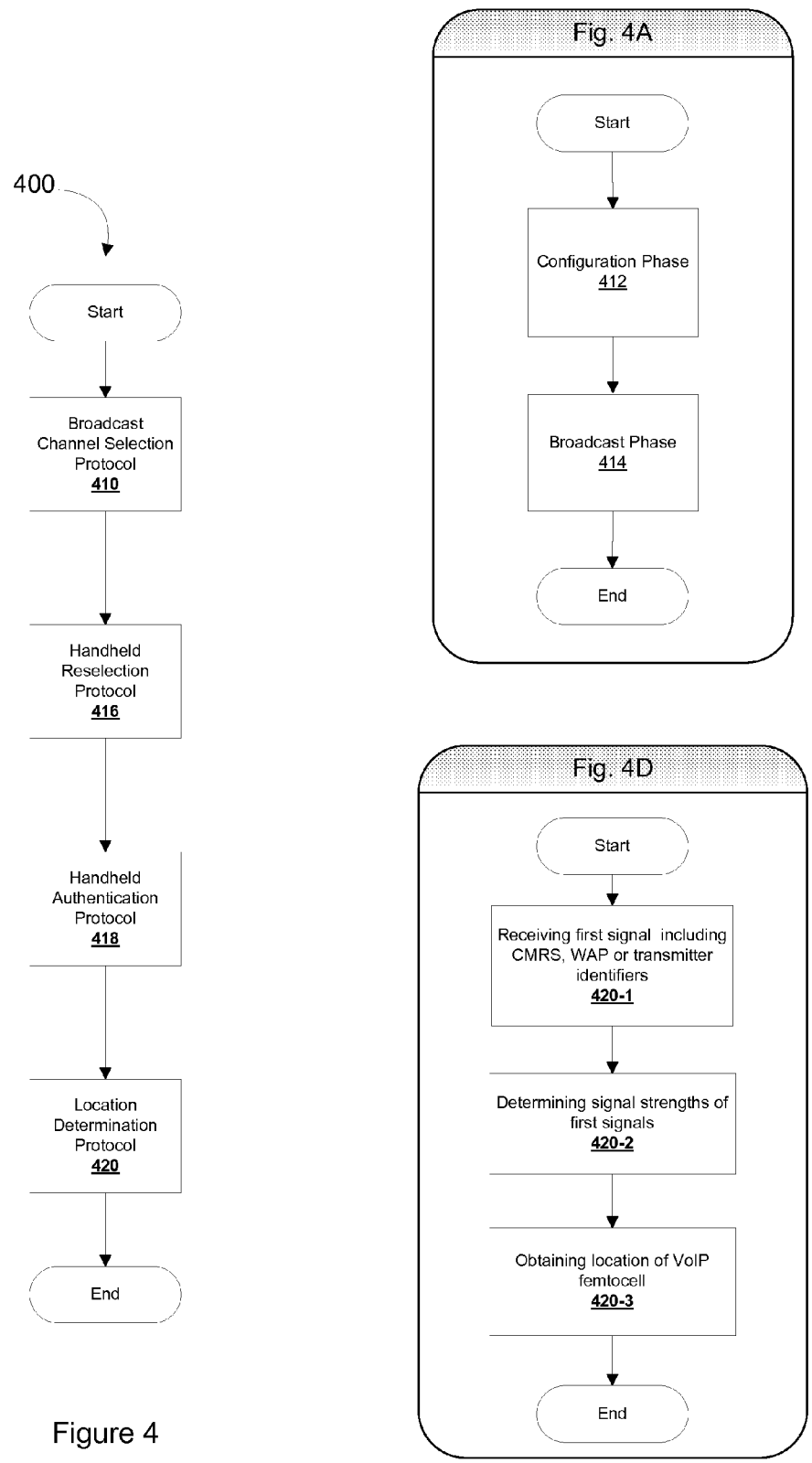

In an embodiment of the disclosure, with reference to the femtocell of FIG. 1 and FIG. 4, the CPU 135 may execute program logic that, at least in part, enables femtocell 100 for in-service use 400 with one or more mobile handheld devices 165. In one aspect, referring to FIG. 4, at step 410 the program logic, at least in part, enables femtocell 100 to perform a broadcast channel selection protocol. Thereafter, at step 416, the CPU 135 may then execute program logic to, at least in part, initiates a handheld reselection protocol so as to enable one or more mobile handheld devices 165 to select femtocell 100 for in-service use 400. At step 418, the CPU 135 may execute program logic that, at least in part, enables the femtocell 100 to initiate a handheld authentication protocol to authenticate and authorize mobile handheld device 165 access to the femtocell for in-service use 400. At step 420, the CPU 135 may optionally execute program logic that, at least in part, performs a location determination protocol. It is to be understood that the location determination protocol of step 420 may occur independently of steps 410-418, and may occur at any time in the sequence of enabling femtocell 100, if location determination is desired.

In certain embodiments, and with reference to FIG. 4A, the broadcast channel selection protocol of step 410 may include a configuration phase 412 and a broadcast phase 414.

Figure 4B:
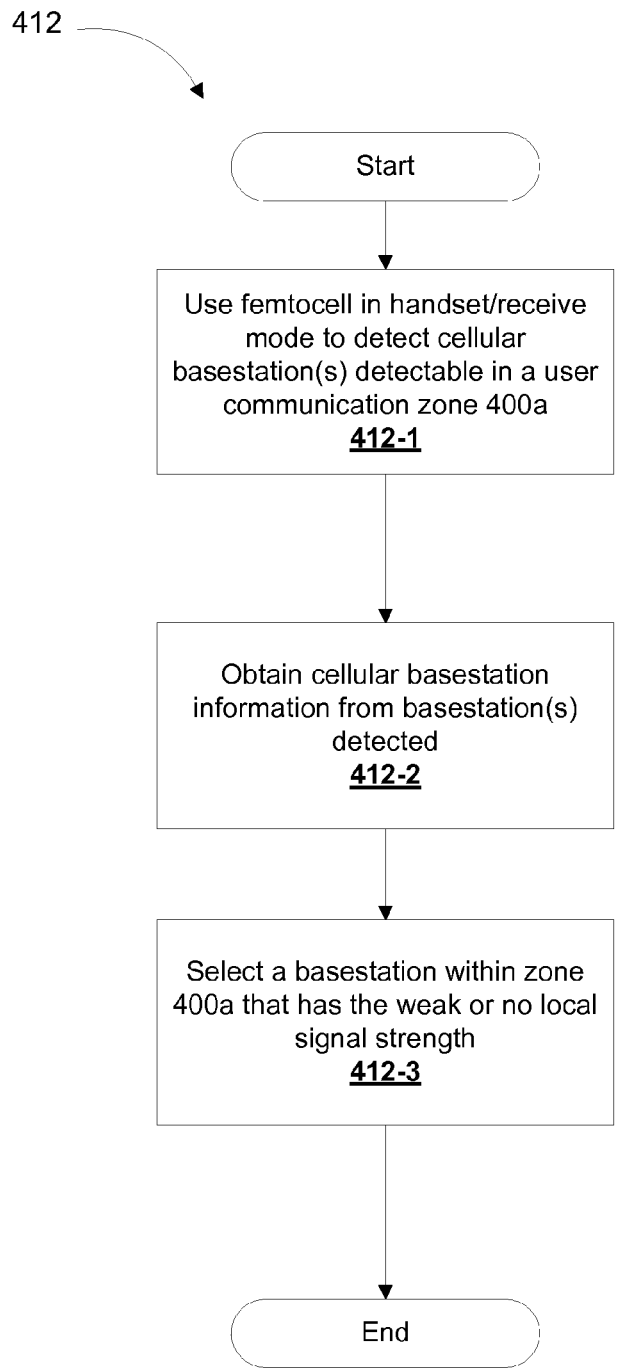

With reference to FIG. 4B, the configuration phase 412 may include the step 412-1 in which femtocell 100 is used in a handset/receive mode to detect at least one commercial mobile radio service (CMRS) basestation with a signal that is detectable in a user communication zone 400a.

By way of example, a user communication zone 400a may be a zone or area in which a mobile handheld device 165 may be used with the femtocell 100. Such a zone may vary based on power output of the femtocell and may, for example, be sufficiently large enough to cover a typical user homestead or office. For example, the user communication zone 400a may be between 50 square feet and 3000 square feet. In a larger homestead, the power output of the femtocell may be modified such that the femtocell can be in communication with a mobile handheld device 165 located anywhere in the homestead. In some embodiments, the output of the femtocell may be such that it is compliant with Part 15 of the regulations of the Federal Communications Commission governing operation of radio frequency devices without an individual license. See 47 C.F.R. §15.1, et seq.

In certain embodiments, all CMRS basestations with a signal that is detectable within the user communication zone are detected. In other embodiments, at least one CMRS basestation with a signal that is detectable within the user communication zone which is/are compatible with a communication standard supported by mobile handheld device 165 is/are detected. By way of example, if mobile handheld device 165 supports GSM, then femtocell 100 may detect only GSM basestation(s) within the user communication zone. In yet other embodiments, one or more CMRS basestations with a signal that is detectable within the user communication zone are detected until at least one CMRS basestation with a weak local signal is detected.

At step 412-2, femtocell 100 may obtain CMRS basestation information from detected, available CMRS basestations detected during step 412-1 (e.g., CMRS basestation identifier information and identifier information of basestations in communication with detected basestations, i.e., "neighborhood basestations"). At step 412-3, a CMRS basestation is selected. In certain embodiments, the CMRS basestation with the weakest detected local signal strength may be selected. In other embodiments, if the femtocell detects more than one basestation with a sufficiently weak signal in the user communication zone, then a CMRS basestation that has a sufficiently weak signal, but not necessarily the weakest signal, may be selected. In yet other embodiments, a CMRS basestation that has no detectable signal strength at femtocell 100 may be selected. For example, a CMRS basestation identifier of a "neighborhood basestation" obtained from a detected CMRS basestation may be selected. Accordingly, even though the femtocell could not detect a signal from the CMRS basestation that it actually selected, it is able to select that basestation because it obtained the basestation's information as a "neighborhood basestation" to a basestation that the femtocell could detect. If multiple CMRS basestations with equivalently or sufficiently weak local signal strength, or no local signal strengths, are detected, selection may be based on other combinations of suitable selection parameters including but not limited to, rank of user handheld reselection parameters, channel identifiers, etc. CMRS basestation information may include, but is not limited to, location identifiers, channel identifiers, available CMRS basestations in communication therewith (i.e., "neighborhood basestations"), signal strength, user handheld reselection parameters, and combinations thereof.

Referring back to FIG. 4A, in one embodiment the broadcast phase 414 may comprise using femtocell 100 in a basestation/broadcast mode to broadcast as a femtocell using basestation information corresponding to the selected CMRS basestation that has a weak or no detectable local signal strength within the user communication zone 400a, which was obtained and selected during the configuration phase 412. Such basestation information corresponding to the selected CMRS basestation may be the basestation information obtained during the configuration phase 412, or may be basestation information modified, but based on the obtained basestation information, so as to increase priority of femtocell 100 as described herein.

With reference to FIG. 4, handheld reselection protocol 416 enables femtocell 100 to broadcast as the primary, dominant CMRS basestation detectable within user communication zone 400*a*, so as to initiate selection of femtocell 100 by mobile handheld devices within the user communication zone for in-service use. As understood by those of skill in the art, upon detecting a dominant CMRS basestation, a mobile handheld device, once within the user communication zone 400*a*, may initiate a location update request/basestation reselection process, as described in further detail below.

In certain embodiments, the handheld reselection protocol 416 may comprise utilizing femtocell 100 in a broadcast mode to broadcast at a higher power relative to other available CMRS basestations detected during configuration phase 412. In other embodiments, the handheld reselection protocol 416 may comprise utilizing femtocell 100 in a broadcast mode to broadcast a handheld reselection parameter (not shown) which is higher in priority than all handheld reselection parameters obtained from the available CMRS basestations detected during the configuration phase 412. Broadcasting at a higher power or broadcasting of a higher priority handheld reselection parameter increases the femtocell ranking to the highest ranking in the user communication zone. Femtocell 100 may utilize the highest power or highest priority handheld reselection parameter in user communication zone 400*a* such that femtocell 100 may broadcast as the dominant basestation in the user communication zone 400*a*, thereby becoming the primary/dominant basestation available to mobile handheld device 165 for in-service use within the user communication zone 400*a*. Upon detecting femtocell 100 as the primary/dominant basestation within user communication zone 400*a*, mobile handheld device 165 may initiate a location update request/reselection process as described below.

Figure 4C:
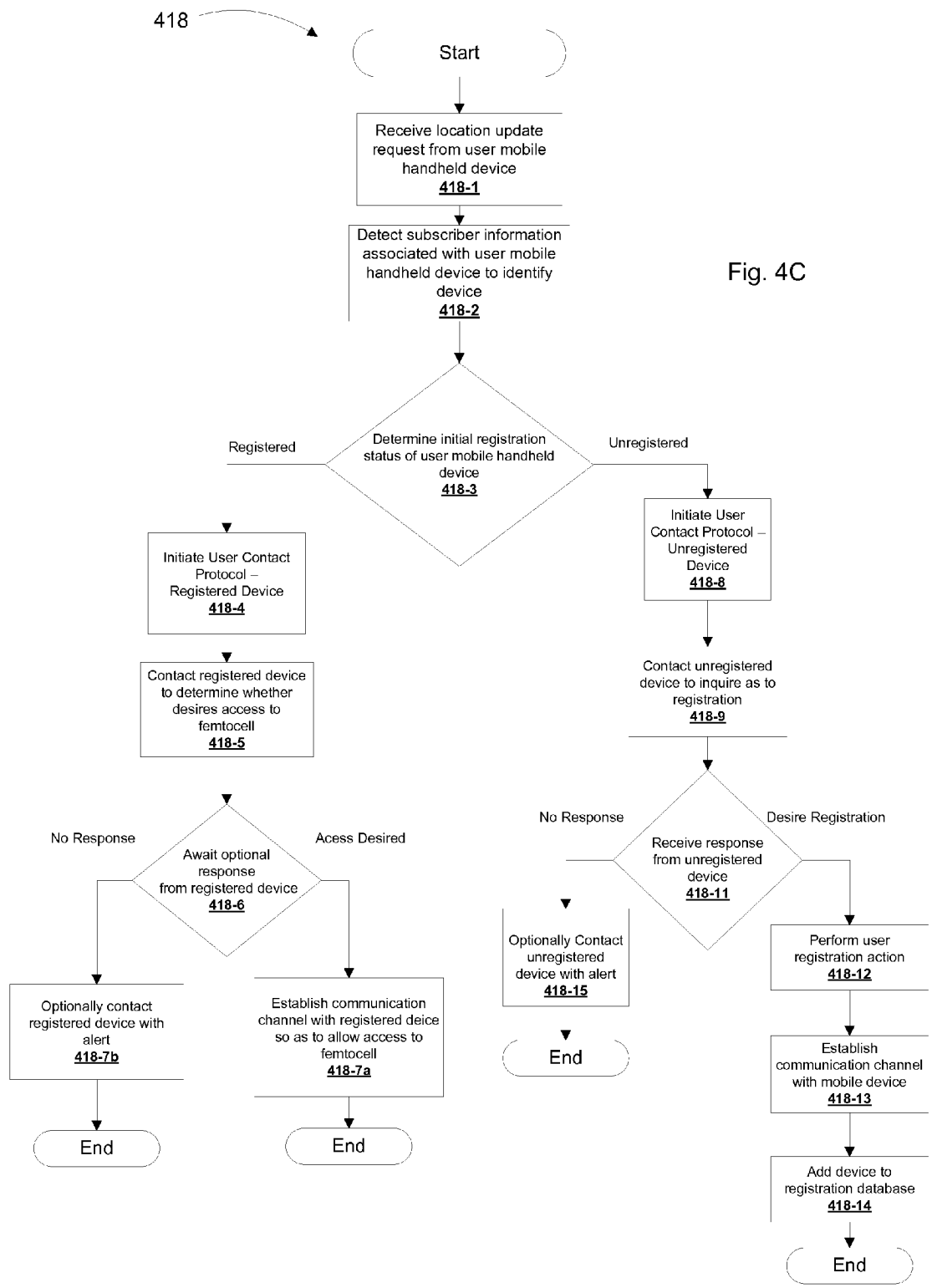

With reference to FIG. 4C, in one embodiment, the handheld authentication protocol 418 may comprise, at step 418-1, the femtocell 100 receiving a location update request from a mobile handheld device 165. A location update request may be any standard location update request from a mobile handheld device, as generally understood by those of skill in the art. By way of non-limiting example, a location update procedure allows a mobile device to inform a CMRS network service provider, e.g., cellular network service provider, when a mobile device moves from one location area to the next. Mobile handheld devices are generally responsible for detecting location area codes. When a mobile handheld device finds that the location area has changed, it performs an update by sending a location update request, together with its previous location, and its subscriber information, e.g., Temporary Mobile Subscriber Identity (TMSI), International Mobile Subscriber Identity (IMSI), etc., to the cellular network provider.

At step 418-2, the femtocell 100 detects the subscriber information associated with the mobile handheld device 165 so as to identify the device. A registration/acceptance process may then be initiated.

At step 418-3, the femtocell 100 executes program logic that, at least in part, enables the femtocell 100 to register and accept a mobile handheld device 165. More specifically, in certain embodiments, at step 418-3, the femtocell determines whether the mobile handheld device 165 is registered or unregistered with the femtocell 100. By way of non-limiting example (not shown), the mobile handheld device may be determined as registered or unregistered via a database or table look-up process. In certain embodiments, a registration database or table may be maintained (e.g., in memory associated with femtocell 100 or a computing device in communication with femtocell 100), where "registered" device identification information is loaded or added to a database or table, and searches of a registration database are performed to determine registration status.

If at step 418-3 it is determined that the device 165 is registered with femtocell 100, then at step 418-4, the femtocell 100 may initiate a user contact protocol which may include, at step 418-5, contacting the registered device (e.g., via a text message, ring back, SMS, etc.) to determine whether the user of the registered device desires access to the VoIP enabled femtocell for in-service use 400. At step 418-6, the program logic executing on the femtocell 100 awaits a response (e.g., via return text message, ring back, SMS, etc.) from the registered device 165. If at step 418-6 a response is received from the registered device that access is desired, then at step 418-7*a*, femtocell 100 may establish a communication channel with the registered device 165 so as to allow access to femtocell 100 for in-service use 400. In the event that at step 418-6 no response is received (or a response that access is not desired is received) from the registered device 165, then at step 418-7*b*, femtocell 100 may optionally contact the registered device 165 with an alert that access will not be granted (e.g., via text message, ring back, SMS, email, etc.). Alternatively, femtocell 100 may not send any further messages to the registered device if no response is received (or a response that access is not desired is received) at step 418-6.

In certain embodiments, at step 418-5 femtocell 100 may simply contact the registered device (e.g., via text message, ring back, SMS, etc.) to alert the user of the registered device that access to femtocell 100 for in-service use 400 has be granted, and femtocell 100 may establish a communication channel with the registered device 165 so as to allow access to femtocell 100 for in-service use 400. Thus, the femtocell may grant access to the registered mobile device (and optionally contact the mobile device to notify it of such access) without awaiting a response from the mobile device or without any further affirmative action by the mobile device and/or the user of the mobile device.

If at step 418-3 it is determined that the device is not registered with the femtocell 100, then at step 418-8 the femtocell 100 may initiate a user contact protocol which may include, at step 418-9, contacting the unregistered device (e.g., via a text message, ring back, SMS, etc.) to determine whether the unregistered device desires access to femtocell 100 for in-service use 400. If at step 418-11, the unregistered device responds that it desired access to femtocell 100 for in-service use 400, then at step 418-12 a user registration action is performed. Following completion of the user registration action, at step 418-13, femtocell establishes a communication channel with the mobile handheld device 165 so as to allow access to femtocell 100 for in-service use 400. In certain embodiments, at step 418-14, the mobile handheld device 165 identification information is optionally added to the registered device database/table for future reference.

If at step 418-11 the unregistered device does not respond, responds negatively to the inquiry, or the user registration action cannot be performed successfully, then at step 418-15 the unregistered device may be contacted with a unauthorized access alert (e.g., via return text message, ring back, SMS, etc.) that indicates that the unregistered mobile handheld device is not allowed access to femtocell 100 for in-service use.

In an alternative embodiment, the femtocell 100 may maintain a database (not shown) of mobile devices that have refused or failed to register with the femtocell within a certain period of time. For example, the femtocell may maintain a list, table or database of every unregistered mobile device that did not respond, responded negatively, or for which the user registration action could not be performed successfully within the past 4, 8, 12, 16, 18, 24, 72 hours, past week, etc. In such an embodiment, the femtocell may not initiate the registration/acceptance process, e.g., steps 418-9 and subsequent steps, if it determines that the unregistered mobile device is listed in such database. Accordingly, for example, if a user of a mobile device declines to register with the femtocell when the mobile device is within the user communication zone, then the femtocell will not attempt to contact that mobile device to inquire regarding registration regardless of how many times that mobile device leaves and re-enters the user communication zone during the predetermined time period.

In certain embodiments, the user registration action may be performed entirely via program logic of the femtocell 100. In other embodiments, one or more steps of the user registration action may be performed via program logic of the femtocell 100, and one or more steps of the user registration action may be performed via a user interface and separate program logic (not shown) and in communication with the femtocell 100, e.g., a user interface and program logic executed via a CPU of a computer (not shown) in communication with the VoIP enabled femtocell 100, wired or wirelessly, via a local area network, wide area network, Internet, etc. By way of non-limiting example, the user registration action may include generating a user profile associated with the identified mobile handheld device via program logic of the femtocell 100 and/or program logic in communication with the femtocell 100. In other embodiments, the user registration action may include entering a password via the mobile handheld device and transmitting the password to femtocell 100. As recognized by those of skill in the art, various combinations of user registration action described herein, known to those in the art, or developed in the future may be utilized.

With reference to FIG. 4D, the location determination protocol 420 may include, the step 420-1 of receiving one or more first signals carrying corresponding one or more commercial mobile radio service (CMRS) tower, wireless access point (WAP), and/or transmitter identifiers that each identify one or more CMRS towers, WAPs, and/or transmitters; the step 420-2 of determining one or more signal strengths of the one or more first signals, and the step 420-3 of obtaining a location of femtocell 100 using the one or more locations of the CMRS towers, WAPs, and/or transmitters and the one or more signal strengths of the one or more first signals.

In accordance with certain embodiments of the location determination protocol, the CPU 135 and/or RF transceiver (s) 130 monitors signals received from one or more CMRS tower, WAP, and/or transmitter to determine their CMRS, WAP, and/or transmitter tower identifiers and also monitor the corresponding signal strength for each of those signals. The CMRS, WAP, and/or transmitter tower identifiers and corresponding signal strengths may be stored in local flash memory (e.g., memory 110 and/or SDRAM 115). In accordance with one embodiment, the CPU 135 may query a database system (e.g., such as that which is provided by Mexens Technology via web service APIs which are offered as part of its NAVIZON positioning system) via an associated computer and its broadband link to identify a latitude and longitude for each CMRS, WAP, and/or transmitter tower, and thereafter use the latitude and longitude and the signal strength for each cell tower to calculate a location for femtocell 100 using well-known triangulation techniques. See, e.g., U.S. Pat. No. 7,397,424, which is incorporated herein by reference. Alternatively, the CPU 135 may query a database system with the latitude and longitude of each CMRS, WAP, and/or transmitter tower along with its corresponding signal strength and have the database system return location identifying information for femtocell 100, such as a calculated location of femtocell 100 expressed in the form of latitude and longitude coordinates.

Once the location identifying information, such as latitude and longitude coordinates, have been determined, a database system, such as Google maps may be queried by the CPU 135 (e.g., via an associated computer and its broadband link) using Google maps APIs to identify the corresponding closest address (or other location identifying information) for femtocell 100 based on the given latitude and longitude. The CPU 135 may then cause the display 105 to display location identifying information for femtocell 100, including the address information received from Google maps database system if desired.

Once the CPU 135 determines a location of femtocell 100, it may, in connection with the handling of an emergency call, transfer, via a cellular network or a packet switched network, location identifying information to a remote device (such as a computer operated by a PSAP) to aid emergency personnel in identifying the location of said communication device. The CPU 135 may implement an emergency call as a cellular-based call via said cellular network using the RF transceiver (s) 130 or a VoIP call via said packet switched network. In certain embodiments, the CPU 135 may first attempt to route an emergency call as a VoIP call via a packet switched network, and then route the call as a cellular call via the RF transceiver(s) if the packet switched network is not available. In other embodiments, CPU 135 may first attempt to route an emergency call as a cellular call, and secondarily attempt to route the emergency call as a VoIP call if the cellular network is not available.

In accordance with one embodiment of the present invention, location identifying information may be provided to a location based service, such as Intrado Inc., which maintains a database of registered locations for femtocell 100. The service, in turn, may provide the location identifying information directly to a PSAP. Although the service may receive location identifying information in the form of an address, it can also convert the location information from latitude and longitude to address information and forward the same to the PSAP.

In accordance with one embodiment, the CPU 135 may store location information in local memory to obtain "registered location information." If desired, the CPU 135 may then execute program logic to evaluate the calculated location of femtocell 100 relative to the registered location information in local memory to identify the closest registered location to the location of femtocell 100, and whether the calculated location and the registered location are within a predetermined distance of each other. The registered location information may include one or more registered locations. If the calculated location of femtocell 100 is not a registered location or within a certain distance of a registered location, the CPU 135 may update the registered location to the calculated location, or may prompt a user to update the registered location information by noting the discrepancy between the calculated location and the registered location and, by way of example, selecting the most current calculated location of femtocell 100 as a suggested new registered location. The CPU 135 may display a prompt for a user to update the registered location on the LC display 105 or a computer associated with femtocell 100. The user may select the calculated location of femtocell 100. The CPU 135 may cause the location to be displayed on the display 105 to aid the user in selecting the current calculated location of femtocell 100 as a registered location.

As mentioned above, although the operation of the CPU 135 and execution of program logic of femtocell 100 has been described above, it may be that one or more of each of the operations/steps described above may be performed by the CPU of another device, such as a computer that is coupled to femtocell 100.

In additional embodiments of the invention, the CPU 135 may execute program logic that routes emergency calls to the RF transceiver(s) 130 which is capable of establishing a two-way communication channel corresponding to the emergency call, the two-way communication channel being established over a cellular network. Specifically, in one embodiment, if the CPU 135 determines that the RF transceiver(s) 130 can engage in two-way communication via the cellular network, then the CPU 135 proceeds to route the call over a cellular network via the transceiver. By way of example, the CPU 135 may determine that the RF transceiver(s) 130 can engage in two-way communication via the cellular network by determining if a cellular signal is present. In an alternative embodiment, the CPU 135 may determine that the RF transceiver(s) 130 can engage in two-way communication via the cellular network by measuring the strength of a cellular signal and comparing it to a pre-determined standard. If the CPU determines that the RF transceiver(s) 130 can not engage in two-way communication via the cellular network, then the CPU 135 proceeds to route the call over the VoIP network. In another embodiment, the CPU attempts to route the call over a cellular network, and if the attempt fails, then the CPU 135 proceeds to route the call over the VoIP network, via, for example, a router and/or broadband modem. In other embodiments, the CPU 135 may first attempt to route an emergency call via the VoIP network, and then via a cellular network if the VoIP network is not available.

Although certain steps or functionalities have been described as being performed by femtocell 100, and/or a laptop or desktop computer to which the femtocell 100 is connected, it is to be understood that these descriptions are not intended in any way to limit or restrict the manner in which the process and methods of the present disclosure are performed. Those with ordinary skill in the art will understand that if a certain or step or functionality is described as being performed by the CPU 135 of femtocell 100, that the step or functionality can be split between the one or more processors of the femtocell, or between processors of the femtocell and a computing device to which the femtocell is connected or in communication, or entirely by one or more processors on a computing device to which the femtocell is connected or in communication. As one example, and not by way of limitation, the steps and functionality described in FIGS. 4 through 4D may be divided between the femtocell and one or more computing devices (laptop, desktop computer, network computer, server, etc.) to which the femtocell is connected or in communication in any combination (wired, wirelessly, local area network, wide area network, Internet, etc.).

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor may read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims, in which all terms are meant in their broadest reasonable sense unless otherwise indicated therein.

We claim:

1. A method for enabling a Voice over Internet Protocol (VoIP) femtocell for in-service use with one or more mobile handheld devices, the method comprising:
    (a) performing a broadcast channel selection protocol via, at least in part, a femtocell comprising at least one radio frequency (RF) transceiver, wherein said broadcast channel selection protocol comprises a configuration phase and a broadcast phase;

wherein said configuration phase comprises using the VoIP femtocell in a handset/receive mode to (i) detect at least one commercial mobile radio service (CMRS) basestation, (ii) obtain CMRS basestation information from the detected CMRS basestation(s), and (iii) select a CMRS basestation that has a weak or no detectable signal strength within a user communication zone;

wherein said broadcast phase comprises using the VoIP femtocell in a basestation/broadcast mode to broadcast within the user communication zone as a VoIP femtocell using basestation information corresponding to the selected CMRS basestation; and (b) performing a handheld reselection protocol via, at least in part, said VoIP femtocell to enable one or more mobile handheld devices to select said VoIP femtocell for in-service use;

wherein said handheld reselection protocol comprises enabling the VoIP femtocell to broadcast as the primary, dominant CMRS basestation detectable within the user communication zone to thereby enable one or more mobile handheld devices to select the VoIP femtocell for in-service use.

2. The method of claim 1, wherein the configuration phase comprises using the VoIP femtocell to detect all CMRS basestations available within the user communication zone.

3. The method of claim 1, wherein the configuration phase comprises using the VoIP femtocell to detect all CMRS basestations available within the user communication zone that are compatible with a communication standard supported by the one or more mobile handheld device.

4. The method of claim 1, wherein the configuration phase comprises using the VoIP femtocell to detect one or more CMRS basestations available within the user communication zone until at least one CMRS basestation with a weak signal within the user communication zone is detected.

5. The method of claim 1, wherein the configuration phase comprises using the VOIP femtocell to detect one or more CMRS basestations available within the user communication zone until identifier information for at least one CMRS basestation with no detectable signal within the user communication zone is obtained.

6. The method of claim 1, wherein the broadcast channel selection protocol is performed entirely by the VoIP femtocell.

7. The method of claim 1, further comprising:
(c) performing a handheld authentication protocol via, at least in part, the VoIP femtocell to authenticate and authorize mobile handheld device access to the VoIP femtocell for in-service use,
wherein said handheld authentication protocol comprises (i) upon receipt of a location update request from a mobile handheld device, performing an identification request including detecting subscriber information associated with the mobile handheld device so as to identify the device, and (ii) initiating a registration process associated with the identified mobile handheld device via a user contact protocol.

8. The method of claim 7, wherein said registration process comprises determining that the identified mobile handheld device is registered with the VoIP femtocell, and establishing a communication channel with the registered device so as to allow access to the VoIP femtocell for in-service use.

9. The method of claim 8, wherein said registration process further comprises initiating a user contact protocol including contacting the registered mobile handheld device to alert a user of the registered device of access to the VoIP femtocell for in-service use, and receiving a response from a user of the registered device.

10. The method of claim 7, wherein said registration process comprises:
(i) determining that the identified mobile handheld device is not registered with the VoIP femtocell; (ii) initiating a user contact protocol including contacting the unregistered mobile handheld device to perform a user registration action; (iii) receiving a response to complete the user registration action, and (iv) establishing a communication channel with the mobile handheld device so as to allow access to the VoIP femtocell for in-service use.

11. The method of claim 7, wherein said registration process comprises:
(i) determining that the identified mobile handheld device is not registered with the VoIP femtocell; (ii) initiating a user contact protocol including contacting the unregistered mobile handheld device to perform a user registration action; and (iii) not allowing the unregistered mobile handheld device access to said VOIP femtocell.

12. The method of claim 11, further comprising contacting the unregistered mobile handheld device with an unauthorized access alert.

13. The method of claim 1, wherein said CMRS basestation information is selected from location identifiers, channel identifiers, available CMRS basestations in communication with identified basestation, signal strength, user handheld reselection parameters, and combinations thereof.

14. The method of claim 1, wherein the VoIP femtocell is compatible for use with a communication standard selected from the group consisting of: Global System for Mobile Communications (GSM), Code Division Multiple Access (CDMA), Universal Mobile Telecommunications System (UMTS), Long Term Evolution (LTE), Worldwide Interoperability for Microwave Access (WiMAX) and CDMA2000.

15. The method of claim 1, further comprising a location determination protocol,
wherein the location determination protocol includes (i) receiving one or more first signals carrying corresponding one or more commercial mobile radio service (CMRS) tower, wireless access point (WAP), and/or transmitter identifiers that each identify one or more CMRS towers, WAPs, and/or transmitters; (ii) determining one or more signal strengths of the one or more first signals, and (iii) obtaining a location of the VoIP femtocell using the one or more locations of the CMRS towers, WAPs, and/or transmitters and the one or more signal strengths of the one or more first signals.

16. The method of claim 15, wherein the location determination protocol further comprises: (i) correlating the one or more identifiers to one or more locations of the CMRS towers, WAPs, and/or transmitters having the one or more identifiers, and (ii) calculating the location of the VoIP femtocell based on the locations and the signal strengths.

17. The method of claim 15, wherein the location determination protocol further comprises: providing location of the VoIP femtocell in connection with an emergency services call.

18. The method of claim 17, wherein the emergency services call is first routed as a VoIP call via a packet switched network in communication with the VoIP femtocell, and secondarily routed via the RF transceiver(s) as a cellular call if the packet switched network is not available.

19. The method of claim 17, wherein the emergency services call is first routed via the RF transceiver(s) as a cellular call, and secondarily routed as a VOIP call via a packet switched network in communication with the VOIP femtocell if a cellular signal is not available.

20. A VoIP femtocell for use with one or more mobile handheld devices and one or more computing devices, said VoIP femtocell comprising:
- at least one RF transceiver(s); and
- program logic that, at least in part, (a) performs a broadcast channel selection protocol including a configuration phase and a broadcast phase; and (b) performs a handheld reselection protocol to enable one or more mobile handheld devices to select the VoIP femtocell for in-service use;
- wherein said configuration phase comprises using the VoIP femtocell in a handset/receive mode to (i) detect at least one commercial mobile radio service (CMRS) basestation, (ii) obtain CMRS basestation information from the detected CMRS basestation(s), and (iii) select a CMRS basestation that has a weak or no detectable signal strength within a user communication zone;
- wherein said broadcast phase comprises using the VoIP femtocell in a basestation/broadcast mode to broadcast within the user communication zone as a VoIP femtocell using basestation information corresponding to the selected CMRS basestation; and
- wherein said handheld reselection protocol comprises enabling the VoIP femtocell to broadcast as the primary, dominant CMRS basestation detectable within the user communication zone to thereby enable one or more mobile handheld devices to select the VoIP femtocell for in-service use.

21. The VoIP femtocell of claim 20, wherein the configuration phase comprises using the VoIP femtocell to detect all CMRS basestations available within the user communication zone.

22. The VoIP femtocell of claim 20, wherein the configuration phase comprises using the VoIP femtocell to detect all CMRS basestations available within the user communication zone that are compatible with a communication standard supported by the one or more mobile handheld device.

23. The VoIP femtocell of claim 20, wherein the configuration phase comprises using the VoIP femtocell to detect one or more CMRS basestations available within the user communication zone until at least one CMRS basestation with a weak signal within the user communication zone is detected.

24. The VoIP femtocell of claim 20, wherein the configuration phase comprises using the VoIP femtocell to detect one or more CMRS basestations available within the user communication zone until identifier information for at least one CMRS basestation with no detectable signal within the user communication zone is obtained.

25. The VoIP femtocell of claim 20, wherein the broadcast selection protocol is performed entirely via said program logic of said VoIP femtocell.

26. The VoIP femtocell of claim 20, further comprising program logic that, at least in part:
- (c) performs a handheld authentication protocol to authenticate and authorize mobile handheld device access to said VoIP femtocell for in-service use,
- wherein said handheld authentication protocol comprises
  (i) upon receipt of a
- location update request from a mobile handheld device, performing an identification request including detecting subscriber information associated with the mobile handheld device so as to identify the device, and (ii) initiating a registration process associated with the identified mobile handheld device via a user contact protocol.

27. The VoIP femtocell of claim 26, wherein said program logic, at least in part, implements a registration process comprising: determining that the identified mobile handheld device is registered with the VoIP femtocell, and establishing a communication channel with the registered device so as to allow access to the VoIP femtocell for in-service use.

28. The VoIP femtocell of claim 27, wherein said program logic, at least in part, implements a registration process further comprises initiating a user contact protocol including contacting the registered mobile handheld device to alert a user of the registered device of access to the VOIP femtocell for in-service use, and receiving a response from a user of the registered device.

29. The VoIP femtocell of claim 26, wherein said program logic, at least in part, implements a registration process comprising:
- (i) determining that the identified mobile handheld device is not registered with the VoIP femtocell; (ii) initiating a user contact protocol including contacting the unregistered mobile handheld device to perform a user registration action; (iii) receiving a response to complete the user registration action, and (iv) establishing a communication channel with the mobile handheld device so as to allow access to the VoIP femtocell for in-service use.

30. The VoIP femtocell of claim 20, wherein said CMRS basestation information is selected from location identifiers, channel identifiers, signal strength, user handheld reselection parameters, and combinations thereof.

31. The VoIP femtocell of claim 20, wherein the VoIP enhanced femtocell is compatible for use with a communication standard selected from the group consisting of: Global System for Mobile Communications (GSM), Code Division Multiple Access (CDMA), Universal Mobile Telecommunications System (UMTS), Long Term Evolution (LTE), Worldwide Interoperability for Microwave Access (WiMAX), and CDMA2000.

32. The VoIP femtocell of claim 20, wherein said program logic, at least in part, implements a registration process comprising:
- (i) determining that the identified mobile handheld device is not registered with the VoIP femtocell; (ii) initiating a user contact protocol including contacting the unregistered mobile handheld device to perform a user registration action; and (iii) not allowing the unregistered mobile handheld device access to said VOIP femtocell.

33. The VOIP femtocell of claim 32, wherein said program logic implements a registration process further comprising contacting the unregistered mobile handheld device with an unauthorized access alert.

34. The VoIP femtocell of claim 20, further comprising program logic that, at least in part, performs a location determination protocol,
- wherein the location determination protocol includes (i) receiving one or more first signals carrying corresponding one or more commercial mobile radio service (CMRS) tower, wireless access point (WAP), and/or transmitter identifiers that each identify one or more CMRS towers, WAPs, and/or transmitters; (ii) determining one or more signal strengths of the one or more first signals, and (iii) obtaining a location of the VoIP femtocell using the one or more locations of the CMRS towers, WAPs, and/or transmitters and the one or more signal strengths of the one or more first signals.

35. The VoIP femtocell of claim 34, wherein the program logic implementing the location determination protocol further performs: (i) correlating the one or more identifiers to one or more locations of the CMRS towers, WAPs, and/or transmitters having the one or more identifiers, and (ii) calculating the location of the VoIP enhanced femtocell based on the locations and the signal strengths.

36. The VoIP femtocell of claim 34, wherein the program logic implementing the location determination protocol further performs: providing location of the VoIP femtocell in connection with an emergency services call.

37. The VoIP femtocell of claim 36, further comprising program logic that, at least in part, first routes an emergency services call as a VoIP call via a packet switched network in communication with the VoIP femtocell, and secondarily routes the emergency services call via the RF transceiver(s) as a cellular call if the packet switched network is not available.

38. The VoIP femtocell of claim 36, further comprising program logic that, at least in part, first routes an emergency services call via the RF transceiver(s) as a cellular call, and secondarily routes the emergency services call as a VoIP call via a packet switched network in communication with the VoIP femtocell if a cellular signal is not available.

* * * * *